United States Patent
Yang

(10) Patent No.: US 7,983,061 B2
(45) Date of Patent: Jul. 19, 2011

(54) SWITCHING CONTROLLER CAPABLE OF REDUCING ACOUSTIC NOISE FOR POWER CONVERTERS

(75) Inventor: Ta-Yung Yang, Milpitas, CA (US)

(73) Assignee: System General Corporation, Sindian, Taipei County (TW)

( * ) Notice: Subject to any disclaimer, the term of this patent is extended or adjusted under 35 U.S.C. 154(b) by 416 days.

(21) Appl. No.: 12/368,334

(22) Filed: Feb. 10, 2009

(65) Prior Publication Data

US 2009/0213626 A1   Aug. 27, 2009

Related U.S. Application Data

(60) Provisional application No. 61/066,744, filed on Feb. 22, 2008.

(51) Int. Cl.
*H02M 1/12* (2006.01)
*H02M 3/335* (2006.01)

(52) U.S. Cl. ............... 363/41; 363/21.13; 363/21.18

(58) Field of Classification Search ........... 363/21.05, 363/21.09, 21.1, 21.13, 21.17, 21.18, 39, 363/40, 41, 42, 43, 56.1, 97
See application file for complete search history.

(56) References Cited

U.S. PATENT DOCUMENTS

| | | | |
|---|---|---|---|
| 5,764,495 A * | 6/1998 | Faulk | 363/21.13 |
| 6,661,679 B1 * | 12/2003 | Yang et al. | 363/41 |
| 6,768,657 B1 * | 7/2004 | Yang et al. | 363/41 |
| 7,400,122 B2 * | 7/2008 | Balakrishnan et al. | 323/277 |
| 7,583,522 B2 * | 9/2009 | Hall et al. | 363/95 |
| 7,679,939 B2 * | 3/2010 | Gong | 363/21.18 |
| 7,701,735 B2 * | 4/2010 | Park et al. | 363/21.16 |
| 7,733,673 B2 * | 6/2010 | Balakrishnan et al. | 363/21.13 |

* cited by examiner

*Primary Examiner* — Gary L Laxton
(74) *Attorney, Agent, or Firm* — Thomas|Kayden

(57) ABSTRACT

The present invention provides a switching controller capable of reducing acoustic noise of a transformer for a power converter. The switching controller includes a switching circuit, a comparison circuit, an activation circuit, and an acoustic-noise eliminating circuit. The acoustic-noise eliminating circuit comprises a first-check circuit, a second-check circuit, a pulse-shrinking circuit, and a limit circuit. The first-check circuit receives a switching-current signal which is correlated to a switching current of the power converter and a PWM signal to generate a trigger signal. The second-check circuit receives the trigger signal to generate a control signal. When the frequency of the trigger signal falls into audio band, the control signal will be enabled to limit the switching current. Therefore, the acoustic noise of the transformer can be eliminated.

8 Claims, 4 Drawing Sheets

SWITCHING CONTROLLER CAPABLE OF REDUCING ACOUSTIC NOISE FOR POWER CONVERTERS

CROSS REFERENCE TO RELATED APPLICATIONS

The present application claims the benefit of U.S. provisional application entitled "Method and Apparatus for Reading the Acoustic Noise of Power Converter", Ser. No. 61/066,744, filed Feb. 22, 2008.

BACKGROUND OF THE INVENTION

1. Field of the Invention

The present invention relates to power converters, and more particularly, relates to a switching controller to reduce acoustic noise of power converters.

2. Description of the Related Art

FIG. 1 shows a schematic circuit of a conventional power converter. For safety reason, the power converter generally includes a transformer 10 having a primary winding $N_P$ and a secondary winding $N_S$ for providing galvanic isolation. An input voltage $V_{IN}$ is supplied to a first terminal of the primary winding $V_P$ of the transformer 10. A transistor 20 coupled to a second terminal of the primary winding $V_P$ of the transformer 10 is controlled by a switching controller 100. Once the transistor 20 is turned on, a switching current $I_P$ flowing through the transistor 20 will increase and the energy will be stored in the transformer 10. As the transistor 20 is turned off, the energy will be transmitted to the secondary winding $N_S$ of the transformer 10. An output voltage $V_O$ built across a capacitor 45 is converted from the energy stored in the transformer 10 via a rectifier 40. Once the output voltage $V_O$ exceeds a reverse breakdown voltage of a zenor diode 50, a feedback voltage $V_{FB}$ indicative of the output voltage $V_O$ of the power converter will be provided to the switching controller 100 via a photo-coupler 60. The zenor diode 50 and a resistor 51 are coupled in series between the rectifier 40 and the photo-coupler 60. A current-sense resistor 30 is coupled between the transistor 20 and a ground reference for converting the switching current $I_P$ into a switching-current signal $V_{CS}$. Therefore, the switching-current signal $V_{CS}$ is in proportion to the switching current $I_P$. The switching controller 100 generates a switching signal $S_{OUT}$ to control the transistor 20 in response to the switching-current signal $V_{CS}$ and the feedback voltage $V_{FB}$.

Referring to FIG. 1, the power converter further comprises a resistor 26 and a capacitor 24 which are coupled in series between the first terminal of the primary winding $N_P$ of the transformer 10 and the ground reference. The transformer 10 further comprises an auxiliary winding $N_A$. The auxiliary winding $N_A$ is magnetically coupled to the primary winding $N_P$. A rectifier 22 is coupled between a joint of the resistor 26 and the capacitor 24 and a first terminal of the auxiliary winding $N_A$. A second terminal of the winding $N_A$ is coupled to the ground reference.

Following equation shows a magnetic force F of the transformer 10:

$$F = B \times l \times N \times I_P$$

where B is the flux density; l is the conductor length; N is the winding-turns; and $I_P$ is the switching current flowing through the transformer 10.

The magnetic force F produced at the air-gap of the transformer 10 may generate acoustic noise if a switching frequency of the switching current $I_P$ is in the audio band. According to the equation above, limiting the switching current $I_P$ decreases the magnetic force F of the transformer 10 and the acoustic noise of the power converter can be therefore reduced.

BRIEF SUMMARY OF THE INVENTION

The present invention provides a switching controller capable of reducing acoustic noise of a transformer for a power converter. The switching controller comprises a switching circuit, a comparison circuit, an activation circuit, and an acoustic-noise eliminating circuit. The switching circuit generates a PWM signal. The comparison circuit comprising a first comparator, a second comparator and a third comparator is used to cycle-by-cycle disable the PWM signal. The activation circuit is used to enable/disable the acoustic-noise eliminating circuit in response to load conditions. The acoustic-noise eliminating circuit comprises a first-check circuit, a second-check circuit, a pulse-shrinking circuit, and a limit circuit. The first-check circuit receives the PWM signal and a switching-current signal to generate a trigger signal. The switching-current signal is correlated to a switching current of the power converter. The second-check circuit receives the trigger signal and a reset signal to generate a control signal. When the frequency of the trigger signal falls into the audio band, the control signal will be enabled to limit the switching current of the power converter. Therefore, the acoustic noise generated by a transformer of the power converter can be eliminated.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 2:
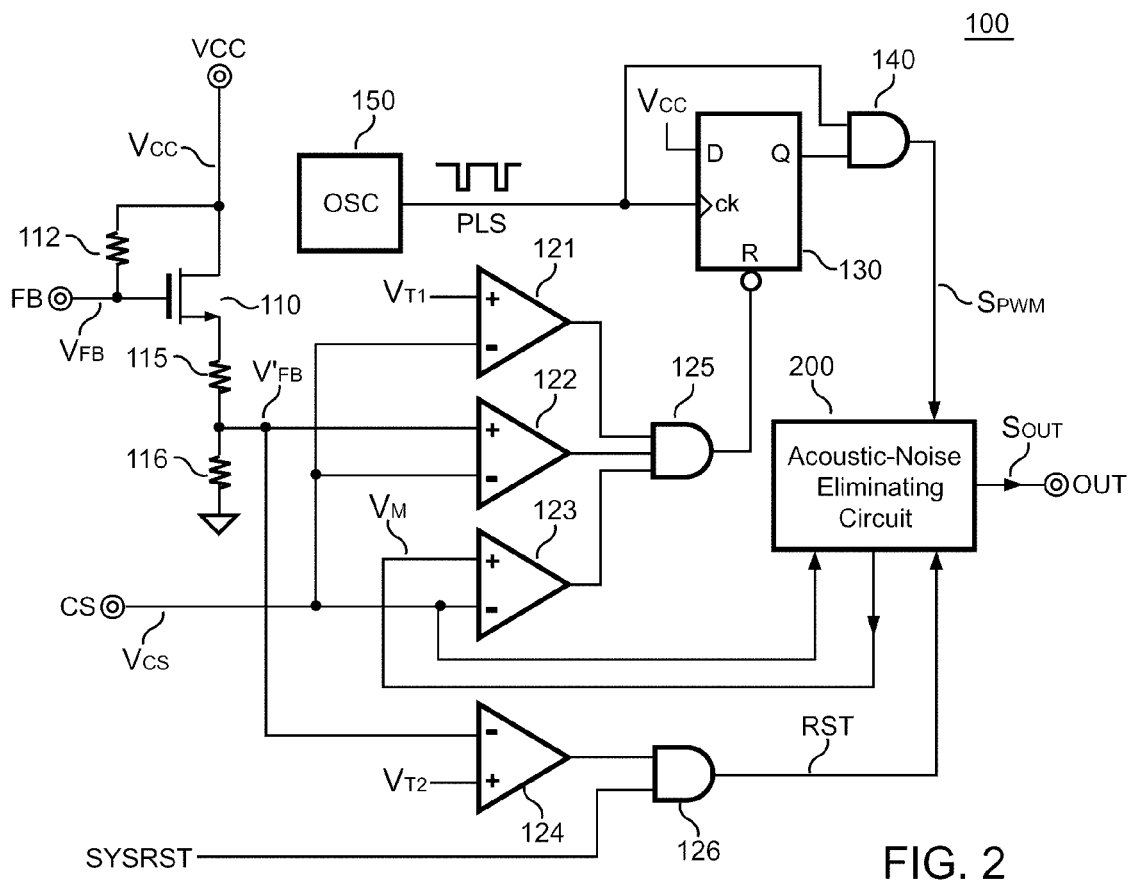
FIG. 2 shows an embodiment of a switching controller of the power converter according to the present invention.

FIG. 2 shows an embodiment of a switching controller 100 of the present invention. The switching controller 100 comprises a feedback input circuit, a comparison circuit, an activation circuit, a switching circuit and an acoustic-noise eliminating circuit 200. The feedback input circuit comprises a transistor 110 having a control terminal coupled to a feedback terminal FB of the switching controller 100. A drain of the transistor 110 is coupled to a supply voltage $V_{CC}$. A pull-high resistor 112 pulls high the feedback terminal FB of the switching controller 100. A voltage attenuator formed by resistors 115 and 116 connected in series is coupled between a source of the transistor 110 and a ground reference. A joint of the resistors 115 and 116 outputs a feedback signal $V'_{FB}$ which is correlated to a feedback voltage $V_{FB}$ at the feedback terminal FB of the switching controller 100. As load condition is reduced, the feedback voltage $V_{FB}$ will reduced in response to an increment of the output voltage $V_O$.

The switching circuit comprises an oscillator 150, a flip-flop 130, and an AND gate 140. The oscillator 150 provides a pulse signal PLS to a clock-input of the flip-flop 130 and an input of the AND gate 140. Another input of the AND gate 140 is coupled to an output of the flip-flop 130. An output of the AND gate 140 generates a PWM signal $S_{PWM}$.

Figure 1:
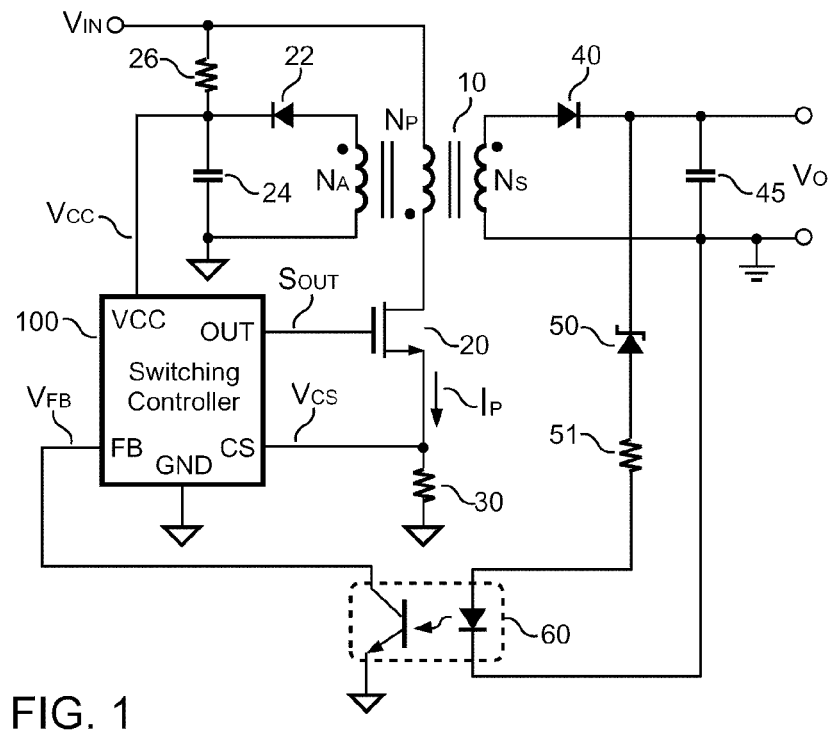
FIG. 1 shows a schematic circuit of a conventional power converter.

The comparison circuit comprises a first comparator 121, a second comparator 122, a third comparator 123, and an AND gate 125. A negative terminal of the first comparator 121 is coupled to a current-sense terminal CS of the switching controller 100 for receiving a switching-current signal $V_{CS}$. The switching-current signal $V_{CS}$ is correlated to the switching current $I_P$ flowing through the transistor 20 in FIG. 1. A positive terminal of the first comparator 121 receives a threshold $V_{T1}$ which is an over-power threshold. Once the switching-current signal $V_{CS}$ exceeds the threshold $V_{T1}$, an output of the first comparator 121 will reset the flip-flop 130 for disabling the PWM signal $S_{PWM}$ via the AND gate 125. A positive terminal of the second comparator 122 receives the feedback signal $V'_{FB}$. A negative terminal of the second comparator 122 receives the switching-current signal $V_{CS}$. Once the switching-current signal $V_{CS}$ exceeds the feedback signal $V'_{FB}$, an output of the second comparator 122 will also reset the flip-flop 130 for disabling the PWM signal $S_{PWM}$ via the AND gate 125. A negative terminal of the third comparator 123 receives the switching-current signal $V_{CS}$. A positive terminal of the third comparator 123 receives a limit signal $V_M$ generated by the acoustic-noise eliminating circuit 200. Once the switching-current signal $V_{CS}$ exceeds the limit signal $V_M$, an output of the third comparator 123 will also reset the flip-flop 130 for disabling the PWM signal $S_{PWM}$ via the AND gate 125.

The activation circuit comprises a fourth comparator 124 and an AND gate 126. A negative terminal of the fourth comparator 124 receives the feedback signal $V'_{FB}$. A positive terminal of the fourth comparator 124 receives a threshold $V_{T2}$ which determines a light-load condition. An input of the AND gate 126 is coupled to an output of the fourth comparator 124. Another input of the AND gate 126 receives a system reset signal SYSRST. The system reset signal SYSRST becomes logic-high state after the switching controller 100 is started up. A reset signal RST is generated at an output of the AND gate 126. Once the feedback signal $V'_{FB}$ is lower than the threshold $V_{T2}$, the output state of the fourth comparator 124 will be logic-high. This will turn the reset signal RST to a logic-high state to activate the acoustic-noise eliminating circuit 200.

Figure 3:
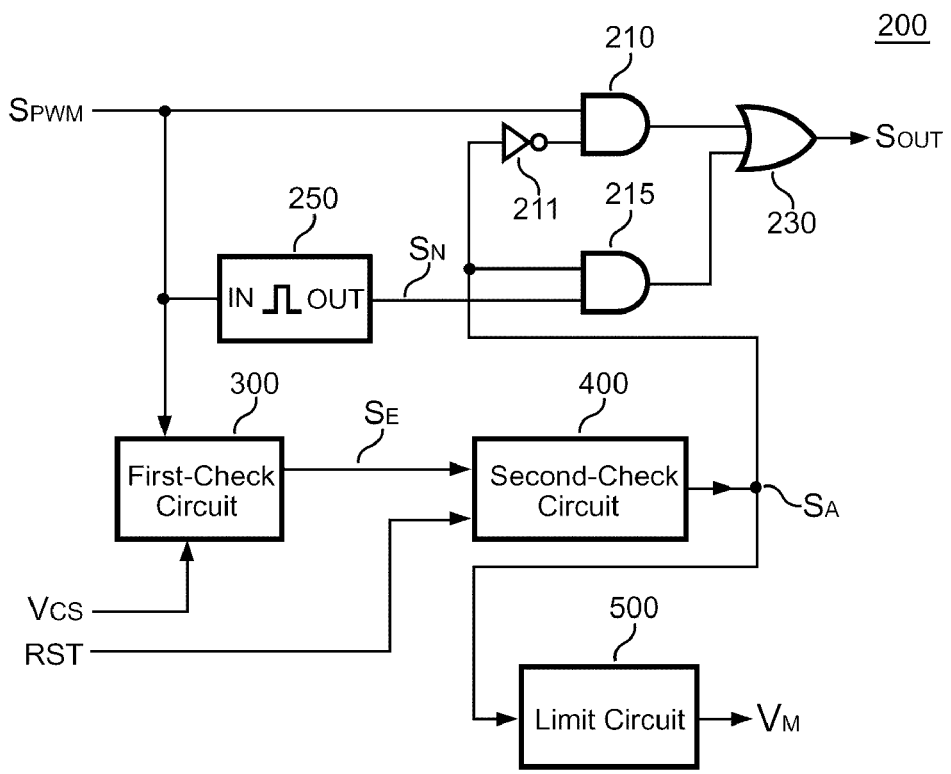
FIG. 3 shows an embodiment of an acoustic-noise eliminating circuit of the switching controller according to the present invention.

FIG. 3 shows an embodiment of the acoustic-noise eliminating circuit 200 according to the present invention. The acoustic-noise eliminating circuit 200 is developed to detect the switching current $I_P$ flowing via the transformer 10. The acoustic-noise eliminating circuit 200 comprises a first-check circuit 300, a second-check circuit 400, a limit circuit 500, and a pulse-shrinking circuit. The first-check circuit 300 receives the PWM signal $S_{PWM}$ and the switching-current signal $V_{CS}$ which is correlated to the switching current $I_P$ to generate a trigger signal $S_E$. The second-check circuit 400 receives the trigger signal $S_E$ for generating a control signal $S_A$ and receives the reset signal RST for disabling the control signal $S_A$. The control signal $S_A$ is enabled to limit the pulse width of a switching signal $S_{OUT}$. This further limits the amplitude of the switching current $I_P$ and therefore eliminates the acoustic noise of the transformer 10. The switching signal $S_{OUT}$ is coupled to switch the transformer 10 via the transistor 20 for generating the switching current $I_P$. The control signal $S_A$ is also supplied to the limit circuit 500 for generating the limit signal $V_M$ which is input to the positive terminal of the third comparator 123. The pulse-shrinking circuit comprises a one-shot circuit 250, an AND gate 210, an AND gate 215, an inverter 211, and an OR gate 230. The PWM signal $S_{PWM}$ is supplied to an input of the one-shot circuit 250 and an input of the AND gate 210. Another input of the AND gate 210 is supplied with the control signal $S_A$ via the inverter 211. An output of the one-shot circuit 250 generates a width signal $S_N$ to an input of the AND gate 215. Another input of the AND gate 215 is supplied with the control signal $S_A$. Two inputs of the OR gate 230 are respectively coupled to an output of the AND gate 210 and an output of the AND gate 215. The PWM signal $S_{PWM}$ is used to generate the switching signal $S_{OUT}$ via an output of the OR gate 230 for regulating the power converter.

Figure 4:
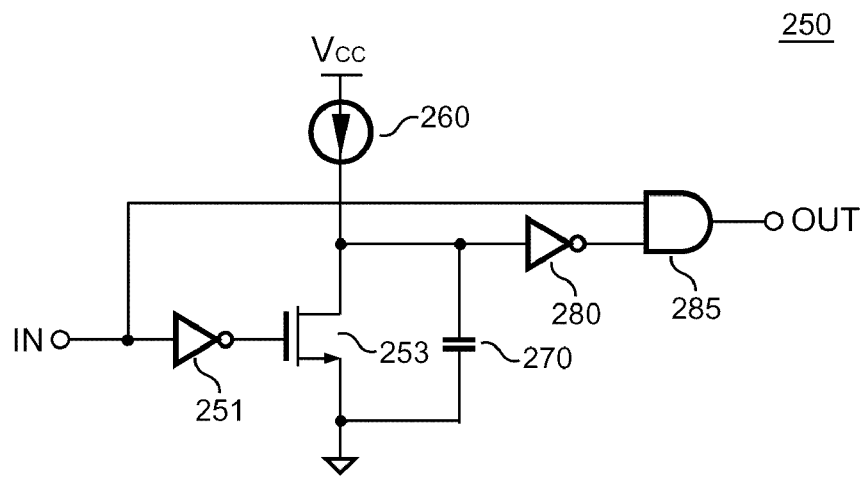
FIG. 4 shows an embodiment of a one-shot circuit according to the present invention.

FIG. 4 shows an embodiment of the one-shot circuit 250 according to the present invention. The one-shot circuit 250 comprises inverters 251 and 280, a current source 260, a transistor 253, a capacitor 270, and an AND gate 285. An input IN of the one-shot circuit 250 is coupled to a gate of the transistor 253 via the inverter 251. The input IN of the one-shot circuit 250 is also coupled to an input of the AND gate 285. The current source 260 is coupled between the supply voltage $V_{CC}$ and a drain of the transistor 253. A source of the transistor 253 is connected to the ground reference. The capacitor 270 is connected between the drain of the transistor 253 and the ground reference. The inverter 280 is coupled between the drain of the transistor 253 and another input of the AND gate 285. An output of the AND gate 285 is coupled to an output OUT of the one-shot circuit 250. As the input IN of the one-shot circuit 250 becomes logic-high state, the output OUT of the one-shot circuit 250 will generate a signal with a pulse width which is determined by the current amplitude of the current source 260 and the capacitance of the capacitor 270.

Figure 5:
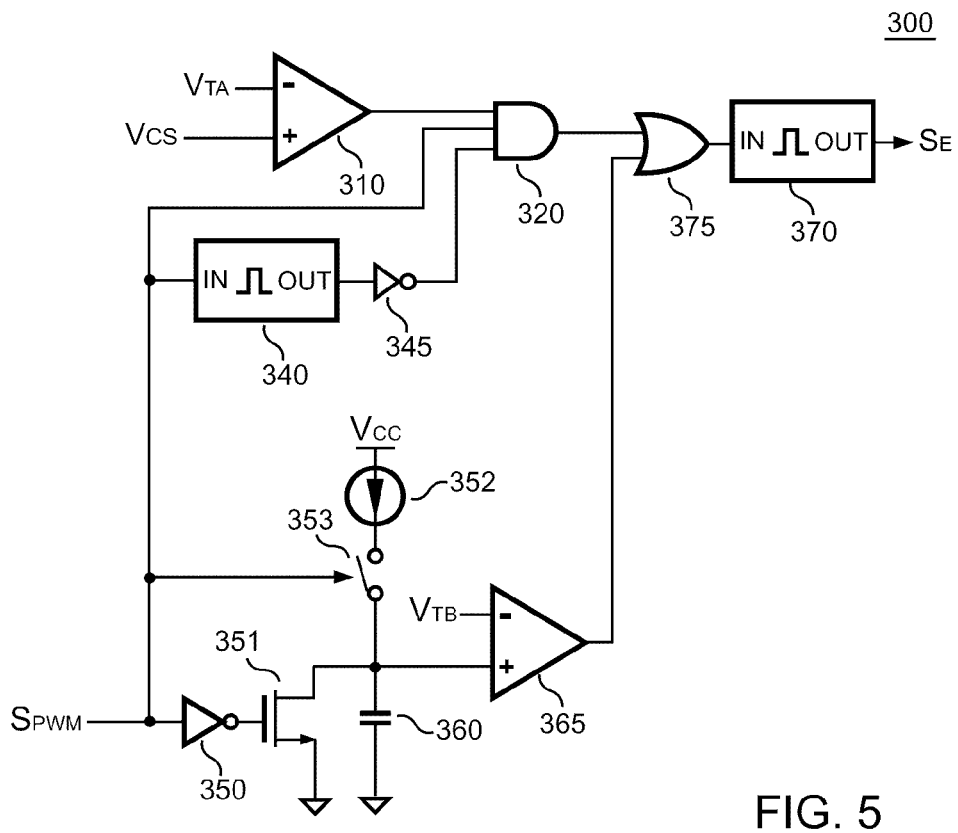
FIG. 5 shows an embodiment of a first-check circuit of the acoustic-noise eliminating circuit according to the present invention.

FIG. 5 shows an embodiment of the first-check circuit 300 according to the present invention. The first-check circuit 300 comprises comparators 310 and 365, inverters 345 and 350, one-shot circuits 340 and 370, an AND gate 320, an OR gate 375, a current source 352, a switch 353, a transistor 351, and a capacitor 360. A negative terminal of the comparator 310 receives a current threshold $V_{T4}$. A positive terminal of the comparator 310 is supplied with the switching-current signal $V_{CS}$. The AND gate 320 has a first input connected to an output of the comparator 310. A second input of the AND gate 320 receives the PWM signal $S_{PWM}$. A third input of the AND gate 320 is coupled to an output of the one-shot circuit 340 via the inverter 345. The one-shot circuit 340 is embodied the same as the one-shot circuit 250 in FIG. 4. An input of the one-shot circuit 340 receives the PWM signal $S_{PWM}$. The transistor 351 is driven by the PWM signal $S_{PWM}$ via the inverter 350. The switch 353 is connected between the current source 352 and a drain of the transistor 351. A control terminal of the switch 353 is controlled by the PWM signal $S_{PWM}$. A capacitor 360 is connected between the drain of the transistor 351 and the ground reference. A positive terminal of the comparator 365 receives a voltage across the capacitor 360. A negative terminal of the comparator 365 receives a pulse-width threshold $V_{TB}$. An output of the AND gate 320 and an output of the comparator 365 are both coupled to the OR gate 375. The one-shot circuit 370 generates the trigger signal $S_E$ in response to an output of the OR gate 375. The one-shot circuit 370 is also embodied the same as the one-shot circuit 250 in FIG. 4. The first-check circuit 300 is coupled to receive the switching-current signal $V_{CS}$ for detecting the amplitude of the switching current $I_P$. The trigger signal $S_E$ is enabled when the amplitude of the switching-current signal $V_{CS}$ exceeds the current threshold $V_{TA}$.

Once the PWM signal $S_{PWM}$ becomes logic-high state, the transistor 351 will be turned off and the switch 353 will be turned on. In the on-period of the PWM signal $S_{PWM}$, the current source 352 will charge the capacitor 360 via the switch 353. As the on-period of the PWM signal $S_{PWM}$ sustains, a voltage across the capacitor 360 representing the pulse width of the PWM signal $S_{PWM}$ will increase accordingly. The trigger signal $S_E$ will be enabled when the voltage across the capacitor 360 exceeds the pulse-width threshold $V_{TB}$. In other words, the pulse-width threshold $V_{TB}$ represents or determines a value for comparison with the pulse width of the PWM signal $S_{PWM}$.

Figure 6:
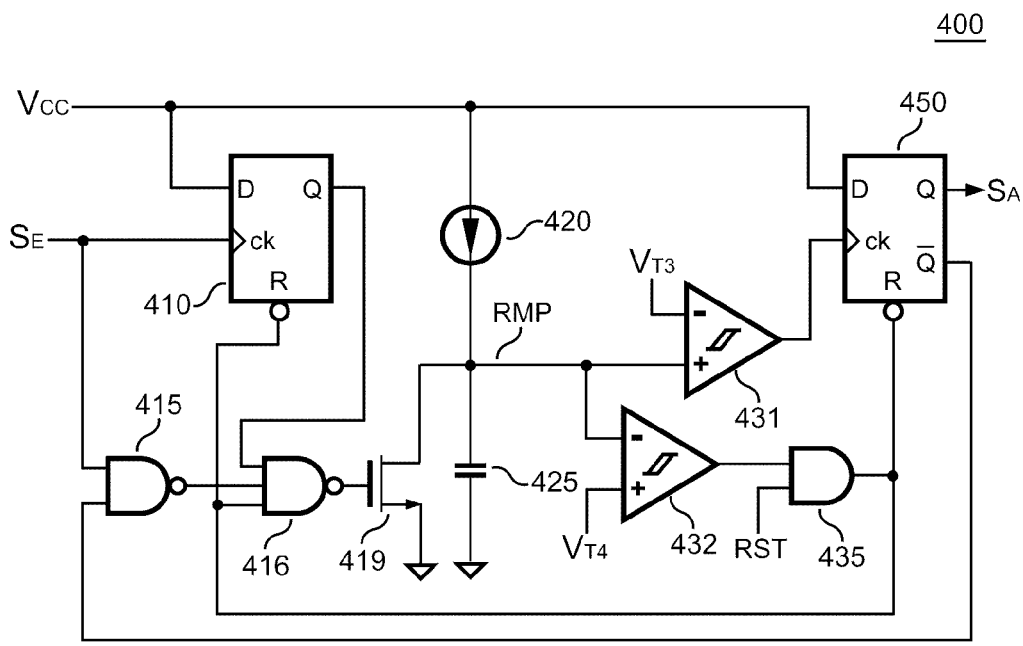
FIG. 6 shows an embodiment of a second-check circuit of the acoustic-noise eliminating circuit according to the present invention.

FIG. 6 shows an embodiment of the second-check circuit 400 according to the present invention. The second-check circuit 400 comprises flip-flops 410 and 450, NAND gates 415 and 416, comparators with hysteresis 431 and 432, a transistor 419, a current source 420, a capacitor 425, and an AND gate 435. A clock-input of the flip-flop 410 and an input of the NAND gate 415 receive the trigger signal $S_E$. Another input of the NAND gate 415 is coupled to an inverted output of the flip-flop 450. An output of the flip-flop 410 is connected to a first input of the NAND gate 416. An output of the NAND gate 415 is coupled to a second input of the NAND gate 416. A reset input of the flip-flop 410, a reset input of the flip-flop 450, and a third input of the NAND gate 416 are all connected to an output of the AND gate 435. An output of the NAND gate 416 is connected to a gate of the transistor 419. The supply voltage $V_{CC}$ is supplied to a D-input of the flip-flop 410, a D-input of the flip-flop 450, and an input of the current source 420. The transistor 419 is connected between the current source 420 and the ground reference. The capacitor 425 is connected with the transistor 419 in parallel. A ramp signal RMP is generated across the capacitor 425. The ramp signal RMP is supplied to a positive terminal of the comparator 431 and a negative terminal of the comparator 432. A negative terminal of the comparator 431 receives a threshold $V_{T3}$ which determines the switching frequency of the switching signal $S_{OUT}$ entering the audio band. A positive terminal of the comparator 432 receives a threshold $V_{T4}$ which determines the switching frequency of the switching signal $S_{OUT}$ leaving the audio band. An output of the comparator 431 is coupled to a clock-input of the flip-flop 450. An output of the comparator 432 is connected to an input of the AND gate 435. Another input of the AND gate 435 receives the reset signal RST from the output of the AND gate 126. An output of the flip-flop 450 generates the control signal $S_A$. The second-check circuit 400 is developed to generate the control signal $S_A$ in response to the frequency of the trigger signal $S_E$. The second-check circuit 400 will enable the control signal $S_A$ when the period of the trigger signal $S_E$ falls into the audio band. Once the control signal $S_A$ is enabled, the acoustic noise of the transformer 10 caused by the switching current $I_P$ can be eliminated.

Figure 7:
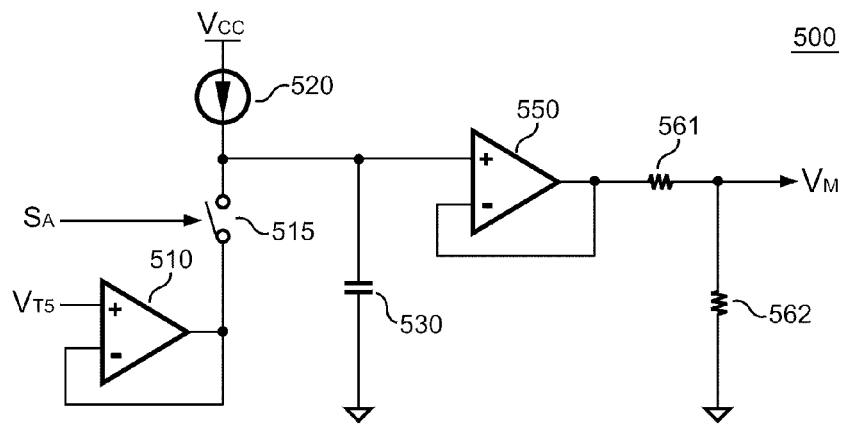
FIG. 7 shows an embodiment of a limit circuit of the acoustic-noise eliminating circuit according to the present invention.

FIG. 7 shows an embodiment of the limit circuit 500 according to the present invention. The limit circuit 500 comprises a current source 520, a switch 515, an operational amplifier 510, a soft-burst capacitor 530, an operational amplifier 550, and a voltage divider. The switch 515 is connected between the current source 520 and an output of the operational amplifier 510. The operational amplifier 510 has a negative terminal connected to its output. A positive terminal of the operational amplifier 510 receives a threshold $V_{T5}$. A positive terminal of the operational amplifier 550 is connected to a joint of the current source 520 and the switch 515. The operational amplifier 550 has a negative terminal connected to its output. The soft-burst capacitor 530 is connected between the positive terminal of the operational amplifier 550 and the ground reference. The voltage divider is formed by resistors 561 and 562 being connected in series. The voltage divider is connected between the output of the operational amplifier 550 and the ground reference. A limit signal $V_M$ is obtained at the joint of the resistors 561 and 562. Referring to FIG. 2 and FIG. 7, the limit signal $V_M$ will decrease to the threshold $V_{T5}$ to limit amplitude of the switching current $I_P$ when the control signal $S_A$ is enabled. Once the control signal $S_A$ is disabled again, the limit signal $V_M$ will gradually rise in response to the voltage across the soft-burst capacitor 530.

Figure 8:
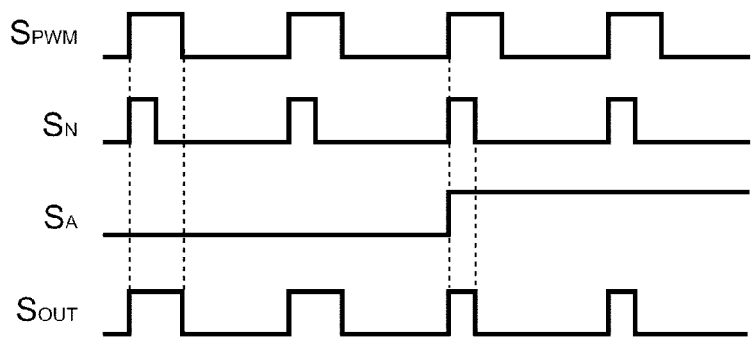
FIG. 8 shows the key waveforms of a pulse-shrinking circuit of the acoustic-noise eliminating circuit according to the present invention.

FIG. 8 shows the key waveforms of the pulse-shrinking circuit of the acoustic-noise eliminating circuit according to the present invention. As the control signal $S_A$ is logic-low (disabled), the pulse width of the switching signal $S_{OUT}$ is equal to that of the PWM signal $S_{PWM}$. As the control signal $S_A$ is logic-high (enabled), the pulse width of the switching signal $S_{OUT}$ will be limited and equal to that of the width signal $S_N$. That is, when the control signal $S_A$ is enabled, the pulse-width of the switching signal $S_{OUT}$ will be shrunk to limit the amplitude of the switching current $I_P$ of the power converter.

Figure 9:
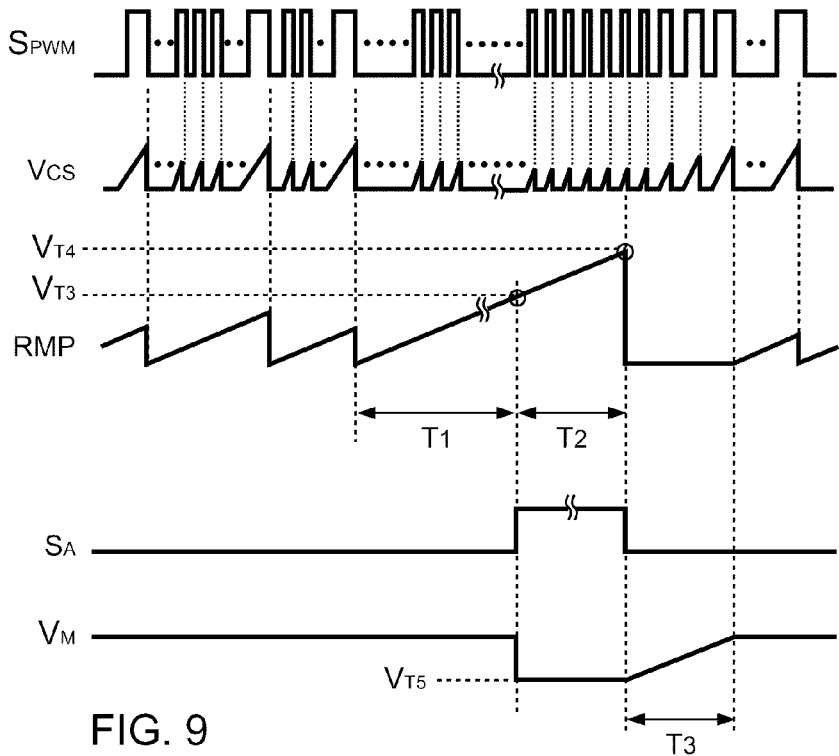
FIG. 9 shows key waveforms of the switching controller according to the present invention.

FIG. 9 shows key waveforms of the switching controller 100. The amplitude of the switching-current signal $V_{CS}$ is proportional to the pulse width of the switching signal $S_{OUT}$. Referring to FIG. 5, FIG. 6 and FIG. 9, once the transistor 419 is turned off, the current source 420 will then charge the capacitor 425. The ramp signal RMP across the capacitor 425 will begin to rise with a slope which is determined by the current of the current source 420 and the capacitance of the capacitor 425. As the ramp signal RMP is lower than threshold $V_{T3}$, the ramp signal RMP is discharged in response to a large switching-current signal $V_{CS}$. Once the ramp signal RMP continues to increase and reach the threshold $V_{T3}$, the control signal $S_A$ will be enabled (period $T_1$). When the ramp signal RMP continues to increase and reach the threshold $V_{T4}$, the control signal $S_A$ will be disabled and the ramp signal RMP is discharged. The thresholds $V_{T3}$ and $V_{T4}$ determine a period $T_2$ of the control signal $S_A$. The frequency of the switching signal $S_{OUT}$ is in the audio band in the period $T_2$. As the control signal $S_A$ is disabled, the switch 515 in FIG. 7 will be turned off and the current source 520 will begin to charge the soft-burst capacitor 530, which makes the limit signal $V_M$ gradually increase (period $T_3$). The pulse width of the PWM signal $S_{PWM}$ will gradually increase accordingly.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A switching controller capable of reducing acoustic noise of a power converter, comprising:
    a switching circuit, generating a PWM (pulse-width-modulation) signal;
    a comparison circuit, resetting said switching circuit cycle by cycle;
    an activation circuit, generating a reset signal; and
    an acoustic-noise eliminating circuit, receiving said PWM signal, a switching-current signal, and said reset signal and generating a switching signal and a limit signal, wherein said switching-current signal is correlated to a switching current of said power converter.

2. The switching controller as claimed in claim 1, wherein said comparison circuit comprises:
    a first comparator, comparing said switching-current signal and a first threshold, wherein said first comparator disables said PWM signal whenever said switching-current signal exceeds said first threshold;
    a second comparator, comparing a feedback signal and said switching-current signal, wherein said second comparator disables said PWM signal whenever said switching-current signal exceeds said feedback signal; and
    a third comparator, comparing said limit signal and said switching-current signal, wherein said third comparator disables said PWM signal whenever said switching-current signal exceeds said limit signal.

3. The switching controller as claimed in claim 2, wherein said activation circuit comprising:
    a fourth comparator, comparing said feedback signal and a second threshold; and
    an AND gate, having an input coupled to an output of said fourth comparator and another input receiving a system reset signal, wherein said acoustic-noise eliminating circuit receives said reset signal from an output of said AND gate.

4. The switching controller as claimed in claim 3, wherein said acoustic-noise eliminating circuit comprises:
    a one-shot circuit, receiving said PWM signal to generate a width signal;
    a first-check circuit, receiving said PWM signal and said switching-current signal and generating a trigger signal, wherein said first-check circuit enables said trigger signal whenever said switching-current signal exceeds a current threshold or whenever a pulse width of said PWM signal is greater than a value which is determined by a pulse-width threshold;
    a second-check circuit, receiving said trigger signal and said reset signal and generating a control signal, wherein said second-check circuit enables said control signal whenever the frequency of said trigger signal falls into the audio band;
    a limit circuit, providing said third comparator with said limit signal for comparison; and
    a pulse-shrinking circuit, receiving said PWM signal, said width signal, and said control signal for generating said switching signal, wherein a pulse width of said switching signal decreases to limit said switching current of said power converter when said control signal is enabled.

5. The switching controller as claimed in claim 4, wherein said pulse width of said switching signal is equal to that of said width signal whenever said control signal is enabled.

6. The switching controller as claimed in claim 4, wherein said limit signal drops to a fifth threshold to limit said switching current of said power converter when said control signal is enabled.

7. The switching controller as claimed in claim 4, wherein said limit signal beginning to gradually increase at the transient that said control signal is disabled from enabled state.

8. The switching controller as claimed in claim 3, wherein said fourth comparator detects a light-load condition to activate said acoustic-noise eliminating circuit.

* * * * *